(12) United States Patent
Havenor et al.

(10) Patent No.: US 12,000,521 B2
(45) Date of Patent: Jun. 4, 2024

(54) SYSTEMS AND METHODS RELATED TO CONDUIT INSULATION

(71) Applicant: Electric Cleaner Company, Inc., Osseo, WI (US)

(72) Inventors: Casey Havenor, Sauk City, WI (US); Trevor James Vold, Osseo, WI (US); Nathan Meronek, Wisconsin Rapids, WI (US); Aaron M. Vold, Osseo, WI (US)

(*) Notice: Subject to any disclaimer, the term of this patent is extended or adjusted under 35 U.S.C. 154(b) by 329 days.

(21) Appl. No.: 17/108,599

(22) Filed: Dec. 1, 2020

(65) Prior Publication Data

US 2021/0215290 A1 Jul. 15, 2021

Related U.S. Application Data

(63) Continuation-in-part of application No. 29/720,671, filed on Jan. 15, 2020, now Pat. No. Des. 994,251.

(51) Int. Cl.
| | |
|---|---|
| *F16L 59/12* | (2006.01) |
| *F16L 59/02* | (2006.01) |
| *F16L 59/153* | (2006.01) |
| *F16L 11/118* | (2006.01) |

(52) U.S. Cl.
CPC .......... *F16L 59/153* (2013.01); *F16L 59/022* (2013.01); *F16L 59/123* (2013.01); *F16L 11/118* (2013.01)

(58) Field of Classification Search
CPC ..... F16L 59/153; F16L 59/022; F16L 59/123; F16L 11/118
USPC .................. 138/110, 128, 158, 167, 106, 107
See application file for complete search history.

(56) References Cited

U.S. PATENT DOCUMENTS

| | | | | |
|---|---|---|---|---|
| 4,643,229 A | * | 2/1987 | Hickin | F16L 11/118 138/121 |
| 5,027,862 A | * | 7/1991 | Laybourn | F16L 55/17 29/402.09 |
| 5,377,670 A | * | 1/1995 | Smith | A62B 9/00 128/207.14 |
| 5,617,900 A | * | 4/1997 | Weil | F16L 59/00 138/110 |
| 6,032,697 A | * | 3/2000 | Kennedy | E03C 1/122 138/89.4 |
| 6,386,238 B1 | * | 5/2002 | Hestetune | B65H 75/362 138/110 |

(Continued)

OTHER PUBLICATIONS

Hanglin YE and Suvranu DE, Thermal injury of skin and subcutaneous tissues: A review of experimental approaches and numerical models, Author manuscript, Aug. 2018, 54 pages, vol. 43, Issue 5.

*Primary Examiner* — David R Deal
(74) *Attorney, Agent, or Firm* — Smith Keane LLP (57) ABSTRACT

Systems and methods according to the present invention utilize improved sleeves for insulating fluid (i.e., liquid and/or gas) conduits. For example, some blow dryers are equipped with a flexible conduit to convey heated air from a heater element to a nozzle for such purposes as material handling, material drying, or even hair drying, such as pet or other animal hair drying. An improved insulating tubular sleeve is provided with securing and/or mounting mechanisms to assist in maintaining sleeve position along a conduit and to reduce heat transfer externally from the conduit, such as by preventing direct contact between animal hair or skin or other materials and the conduit.

19 Claims, 7 Drawing Sheets

(56) References Cited

U.S. PATENT DOCUMENTS

| | | | |
|---|---|---|---|
| 6,701,982 B1* | 3/2004 | Ortiz | B67D 7/06 |
| | | | 141/311 A |
| 6,814,105 B1* | 11/2004 | Crim, Jr. | B32B 17/02 |
| | | | 156/215 |
| 7,086,422 B2* | 8/2006 | Huber | F16L 59/021 |
| | | | 128/207.14 |
| 7,654,239 B2* | 2/2010 | Anthon | F01N 13/14 |
| | | | 60/599 |
| 2004/0103949 A1* | 6/2004 | Rickards | F16L 57/00 |
| | | | 138/158 |
| 2005/0115625 A1* | 6/2005 | White | F16L 59/021 |
| | | | 138/158 |
| 2009/0223585 A1* | 9/2009 | Buller | E03B 7/10 |
| | | | 138/128 |
| 2010/0282356 A1* | 11/2010 | Sawyer, Sr. | F16L 11/14 |
| | | | 138/137 |

* cited by examiner

SYSTEMS AND METHODS RELATED TO CONDUIT INSULATION

PRIOR RELATED APPLICATION

This application is a continuation-in-part of co-pending U.S. Design patent application Ser. No. 29/720,671, filed 15 Jan. 2020 and titled "Hose Sleeve," which is incorporated herein by reference in its entirety.

BACKGROUND

Tubular structures (e.g., pipes or hoses) are commonly used as conduits for blown and/or pressurized air or other gases. In certain environments, animals (human and/or non-human) may be exposed to accidental physical contact with a gas conduit. One such environment is in a wash/dry setting where blow dryers may be used to dry a previously bathed animal. A blow dryer, which may be a wall-mounted dryer, includes a heating element through or across which ambient air is drawn or blown and then redirected through an output hose. Accordingly, hot air is being forced through (and may be partially pressurized in) the conduit, thereby causing the conduit itself to increase in temperature. Depending upon the heat conductivity of the conduit material and the temperature of the heated air inside of the conduit, the outside surface of the conduit may cause at least discomfort to an animal in contact with the conduit and at most cause tissue damage, such as by burning the animal.

Accordingly, gas conduits and use thereof by and/or in connection with animals (human and/or non-human) may be improved by systems and devices related to insulating at least a portion of a gas conduit.

SUMMARY

Embodiments of systems and methods according to the present invention relate to improved insulation of gas conduits, such as air hoses.

According to an embodiment of a device according to the present invention, a tubular structure extends between an open proximal free end and an open distal free end. A first securing means (e.g., hook-and-loop and/or elastic) is coupled to (e.g. secured/sewn or releasably coupled to) and extends radially from the tubular structure, the first securing means being disposed at a first longitudinal location closer to one of the distal end and the proximal end than to the other of the proximal end and the distal end. The first securing means is extendable about a circumference of the tubular structure at the first longitudinal location.

According to an aspect of an embodiment of a device according to the present invention, a second securing means (e.g., hook-and-loop and/or elastic) is coupled to (e.g. secured/sewn or releasably coupled to) and extends radially from the tubular structure, the second securing means being disposed at a second longitudinal location closer to the other of the proximal end and the distal end. The second securing means is extendable about a circumference of the tubular structure at the second longitudinal location.

According to another aspect of an embodiment of a device according to the present invention, the device includes a relief slot extending longitudinally inward from one of the proximal end and the distal end of the tubular structure, the relief slot terminating between the one of the proximal end and the distal end and the first securing means.

An embodiment of a system according to the present invention includes a substantially tubular structure extending between an open proximal free end and an open distal free end. A conduit extends at least partially through the substantially tubular structure, and a securing means is coupled to and extends radially from the tubular structure. The securing means releasably secures (e.g., frictionally) the substantially tubular structure about at least a portion of the conduit.

According to an aspect of an embodiment of a system according to the present invention, the conduit extends completely through the substantially tubular structure.

According to another aspect of an embodiment of a system according to the present invention, the conduit comprises a free end terminating with a nozzle.

According to another aspect of an embodiment of a system according to the present invention, the system being disposed in an environment including an ambient temperature external to the system, a fluid (e.g., liquid or gas) is disposed within the conduit, wherein a temperature differential between the fluid and the ambient temperature. The temperature differential may be in the range of about 10 to about 100 degrees Fahrenheit, or more, with about 50 to about 120 degrees Fahrenheit being preferred.

According to still another aspect of an embodiment of a system according to the present invention, the fluid (e.g., air) is warmer than the ambient temperature and it moves through the conduit in a direction from the proximal end towards the distal end.

According to still another aspect of an embodiment of a system according to the present invention, the conduit comprises a substantially cylindrical flexible tube, which may include a corrugated circumferential wall.

An embodiment of a method according to the present invention includes the steps of providing a conduit, and providing a substantially tubular structure having an open proximal end an open distal end. Circumferential securing means (e.g., straps) are provided, and the substantially tubular structure is secured about the conduit using the circumferential securing means. Fluid is then passed or forced through the conduit.

According to an aspect of an embodiment of a method according to the present invention, the conduit (which may terminate at a free end with a nozzle) may be inserted into the open proximal end and extend completely through the substantially tubular structure, terminating at or extending through the open distal end. Fluid may be dispensed from the nozzle.

According to another aspect of an embodiment of a method according to the present invention, the substantially tubular structure is secured closer to the open distal end than to the open proximal end. Additionally or alternatively, the substantially tubular structure may be secured closer to the open proximal end than to the open distal end.

DETAILED DESCRIPTION

Although the disclosure hereof enables those skilled in the art to practice the invention, the embodiments described merely exemplify the invention which may be embodied in other ways. While the preferred embodiment has been described, the details may be changed without departing from the invention, which is defined by the claims.

Figure 1:
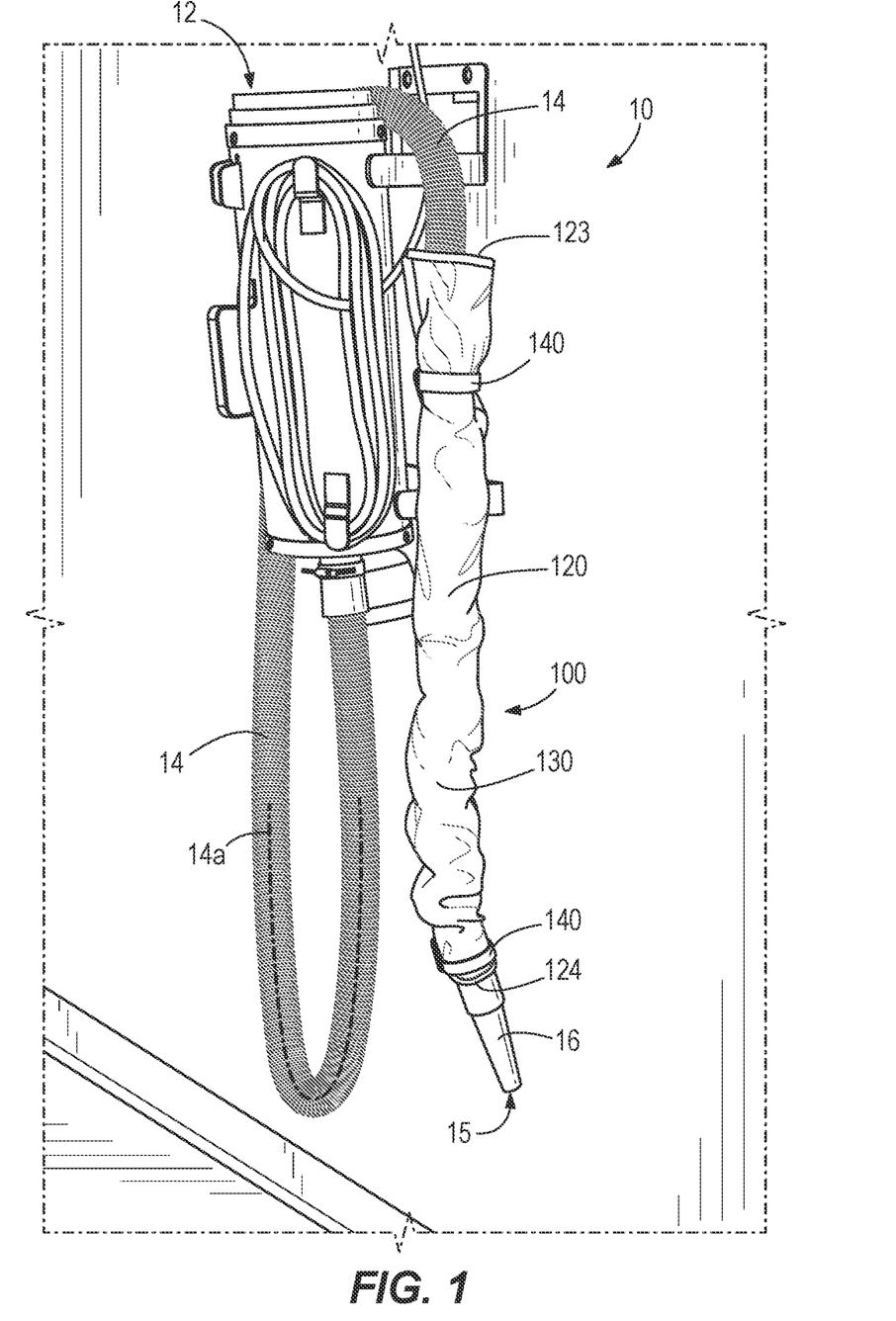
FIG. 1 is a perspective view of an embodiment of a system according to the present invention.
Figure 2:
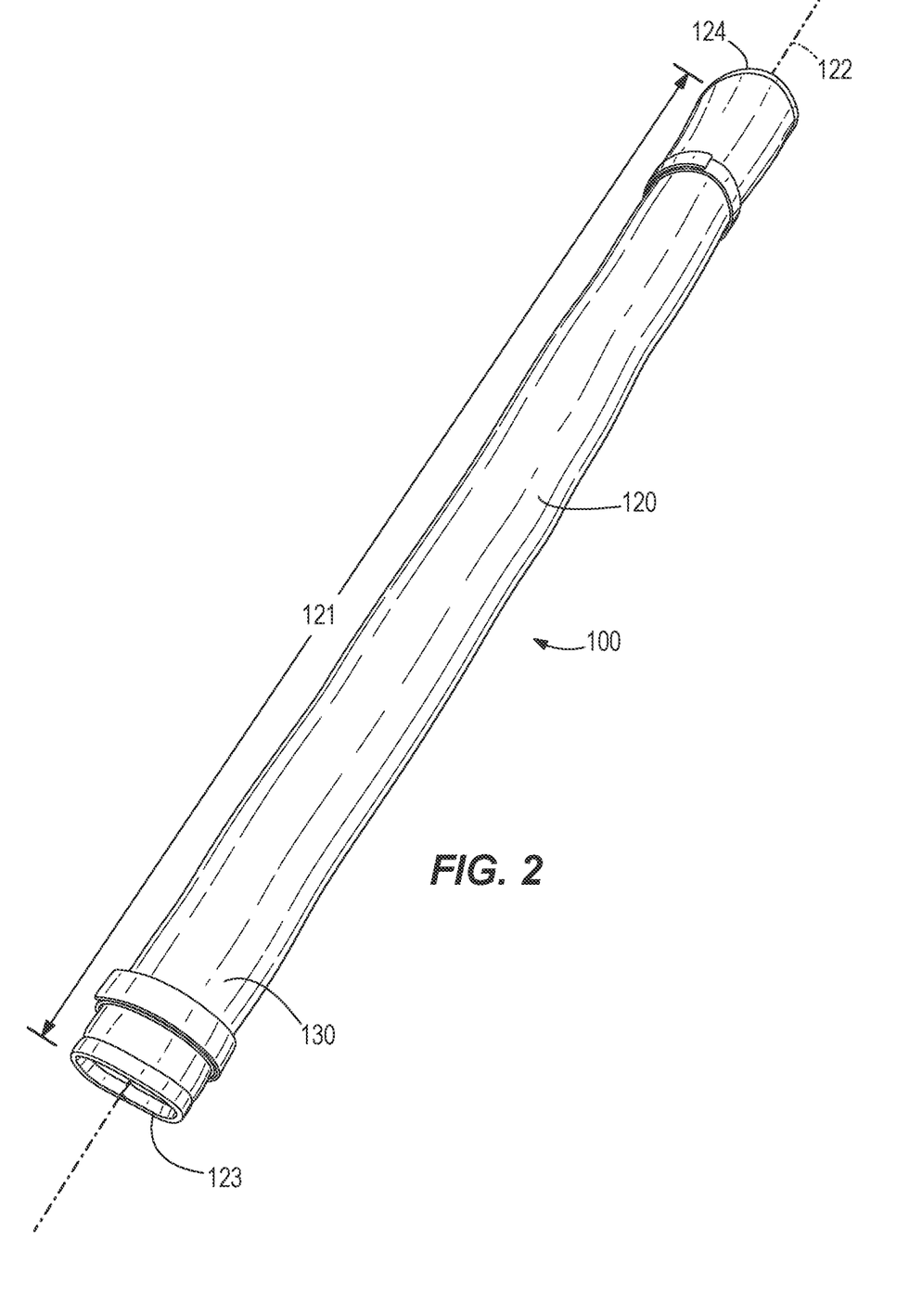
FIG. 2 is a first perspective view an embodiment of a sleeve according to the present invention in a secured position.

Turning now to the figures, FIG. 1 depicts an embodiment 10 of a system according to the present invention, including a blow dryer 12, a fluid conduit 14 extending from the dryer 12 to a nozzle 16, and an embodiment 100 of a conduit insulating sleeve.

Referring more particularly to FIGS. 2-7, the sleeve 100 may be more completely described. The sleeve 100 generally includes a sleeve body 120 formed as a substantially tubular structure having a sleeve length 121 extending along a longitudinal sleeve axis 122. The sleeve body 120 has a hollow core 120a extending longitudinally along the sleeve axis 122, from an open proximal end 123 to an open distal end 124. The sleeve 100 generally includes one or more securing means 140 used to secure the sleeve body 120 relative to a conduit 14 when the conduit 14 is positioned inside the hollow core 120a of the sleeve body 120.

The sleeve length 121 is generally defined by the distance between the proximal end 123 and the distal end 124. The sleeve body 120 may have a substantially circular cross-sectional shape, but may also have a substantially rectangular, square, triangular, or some other cross-sectional geometric or irregular shape. Furthermore, the cross-sectional shape of the sleeve body 120 may vary depending on and substantially mate with the cross-sectional shape of the conduit 14 around which it is or is intended to be installed.

Figure 7:
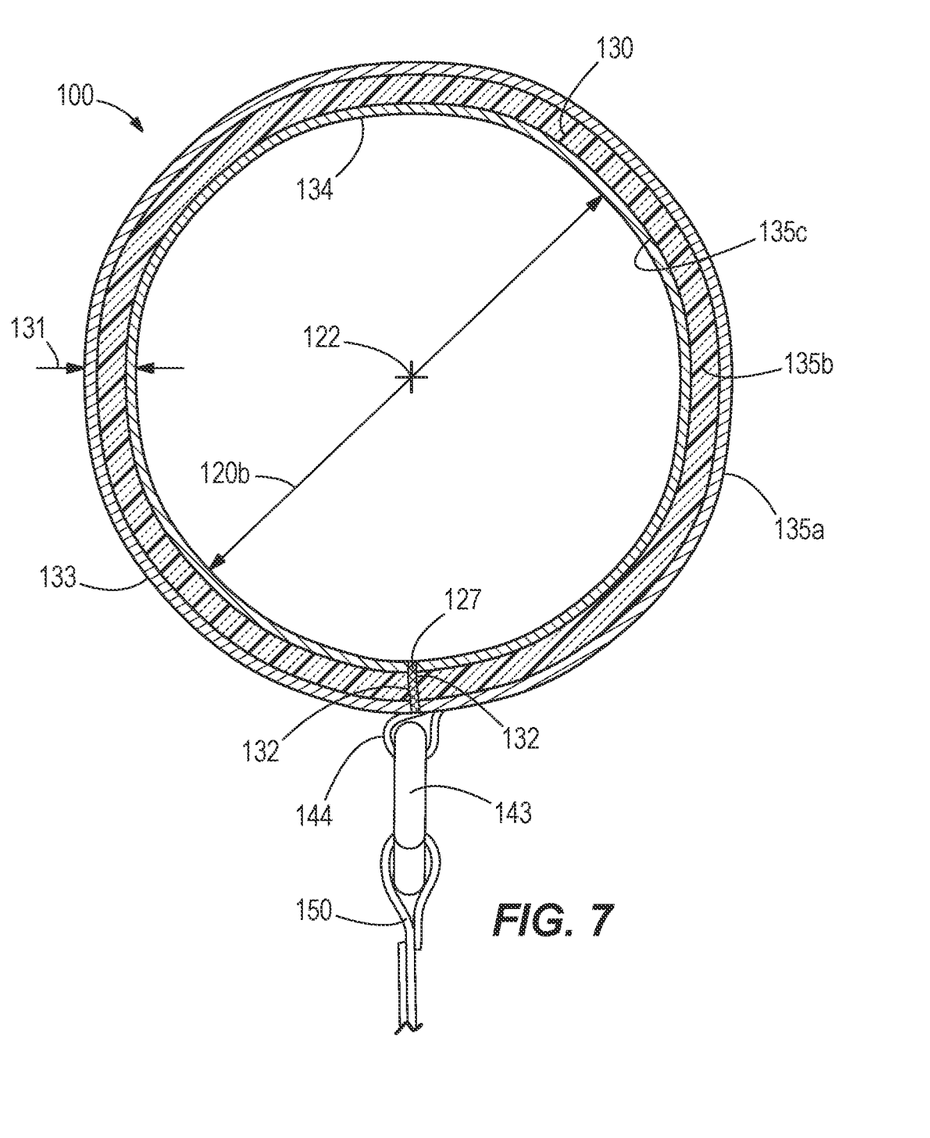
FIG. 7 is a cross-sectional view taken along line 7-7 of FIG. 5.

The sleeve body 120 has a sleeve wall 130 with a wall thickness 131. The wall thickness 131 is substantially uniform throughout the sleeve wall 130. The sleeve wall 130 includes at least an outer surface 133 and an inner surface 134. The distance between the outer surface 133 and inner surface 134 is equal to the wall thickness 131. According to an exemplary embodiment, the wall 130 may be comprised of one or more layers 135 including an outer layer 135a creating the outer surface 133, one or more intermediate layers 135b, and an inner layer 135c creating inner surface 134.

The one or more layers 135 of the sleeve wall 130 may be comprised of generally pliable materials, thereby permitting the cross-sectional shape of the sleeve body 120 to be formed according to the cross-sectional shape of the conduit 14 over which the sleeve body 120 is installed.

According to an exemplary embodiment, the inner layer 135c may be comprised of a material having thermally advantageous properties, such as a thermally-reflective fabric (e.g., Omni-Heat® or Temptrol® fabrics). Furthermore, the one or more intermediate layers 135b may be comprised of one or more insulating fabrics having non-conductive thermal properties. For example, the intermediate layer(s) 135b may consist of a thermal batting material. The outer layer 135a may be comprised of a material having non-conductive thermal properties. Alternatively or additionally, the outer layer may advantageously be comprised of a waterproof or moisture-wicking material. The outer layer 135a may exhibit a color, pattern, design, logo, or text so as to make the aesthetically pleasing and to draw users towards the sleeve 100 and away from exposed conduit 14 to reduce risk of injury or burn.

In some embodiments, the one or more layers 135 may be bonded together by sewing, adhesive means, some combination thereof, or other bonding means. In such embodiments, the bonding means may substantially prohibit the movement of the intermediate layer(s) 135b between the outer layer 135a and the inner layer 135c. Alternatively, the outer layer 135a may only be periodically joined with the inner layer 135c (e.g., in a quilted grid pattern), thereby permitting substantial movement of the intermediate layer(s) 135b between the inner layer 135c and the outer layer 135a.

In other embodiments, the sleeve body 120 may be comprised of only one layer 135, wherein the outer surface 133 and inner surface 134 of sleeve body 120 are formed by the outer and inner surfaces of a single layer 135, respectively.

Figure 4:
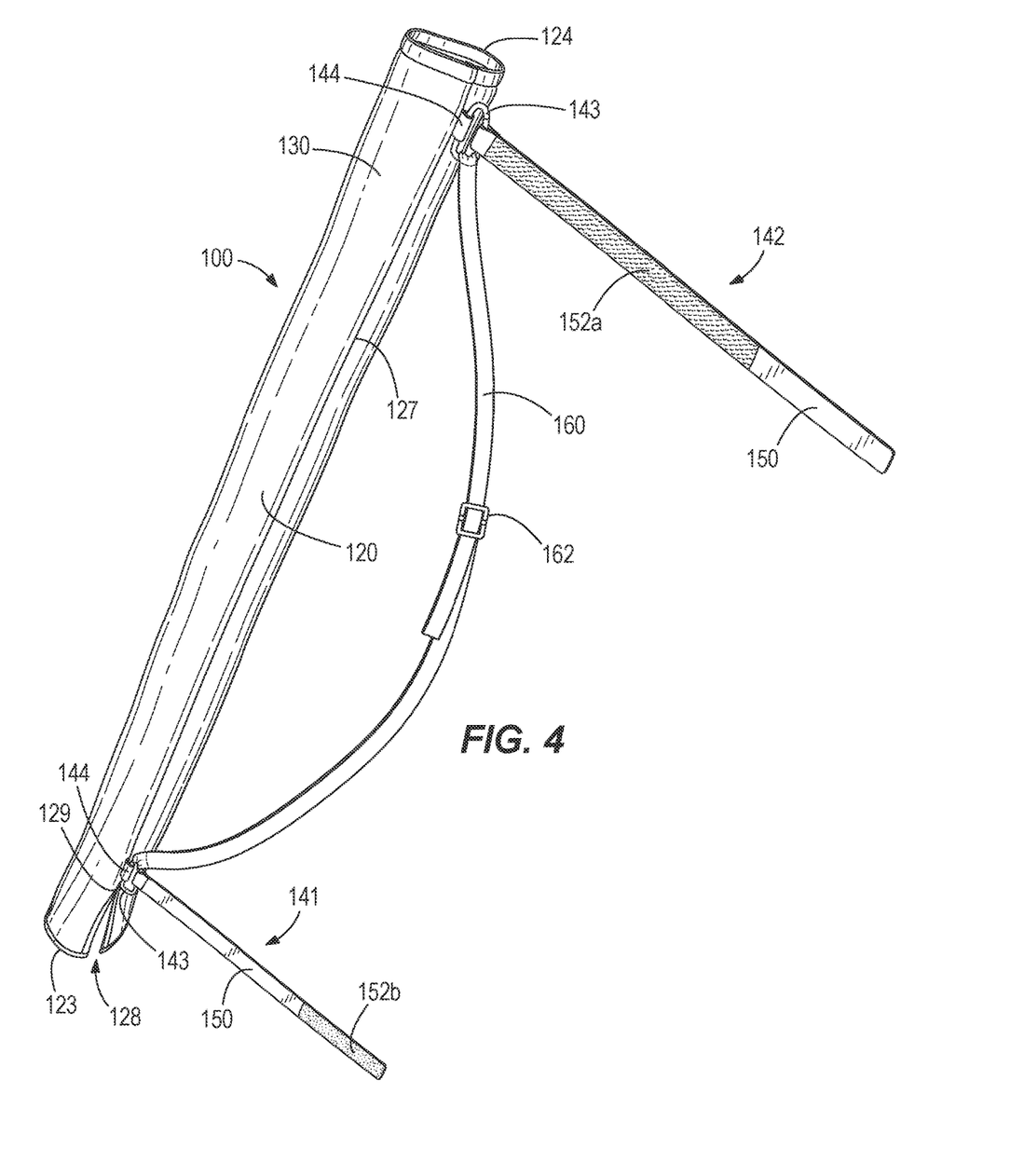
FIG. 4 is a third perspective view of the embodiment of FIG. 2 in an unsecured position.
Figure 5:
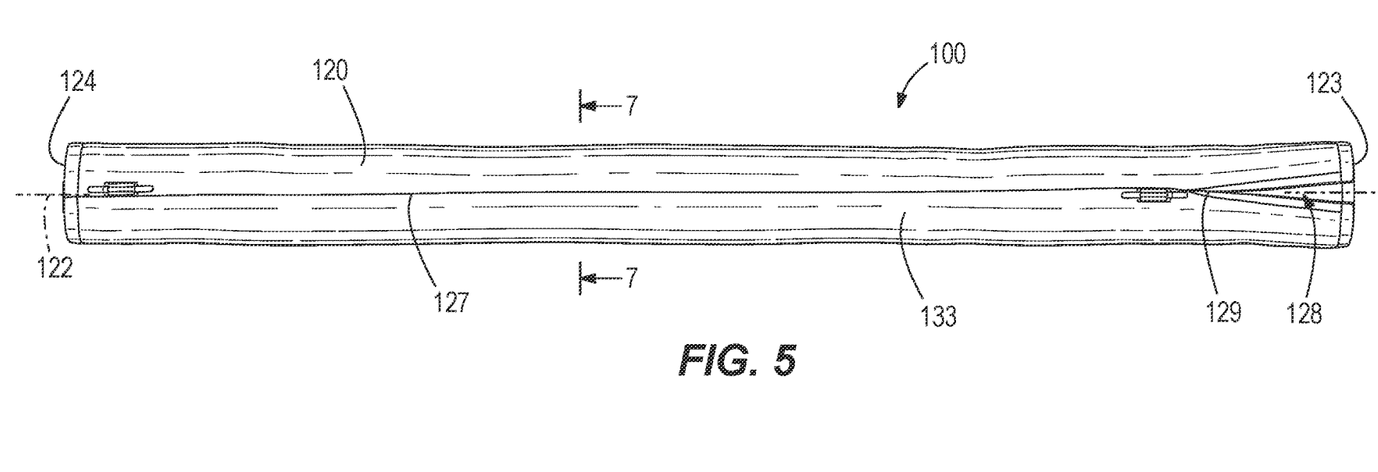
FIG. 5 is a front elevation view of the embodiment of FIG. 2.
Figure 6:
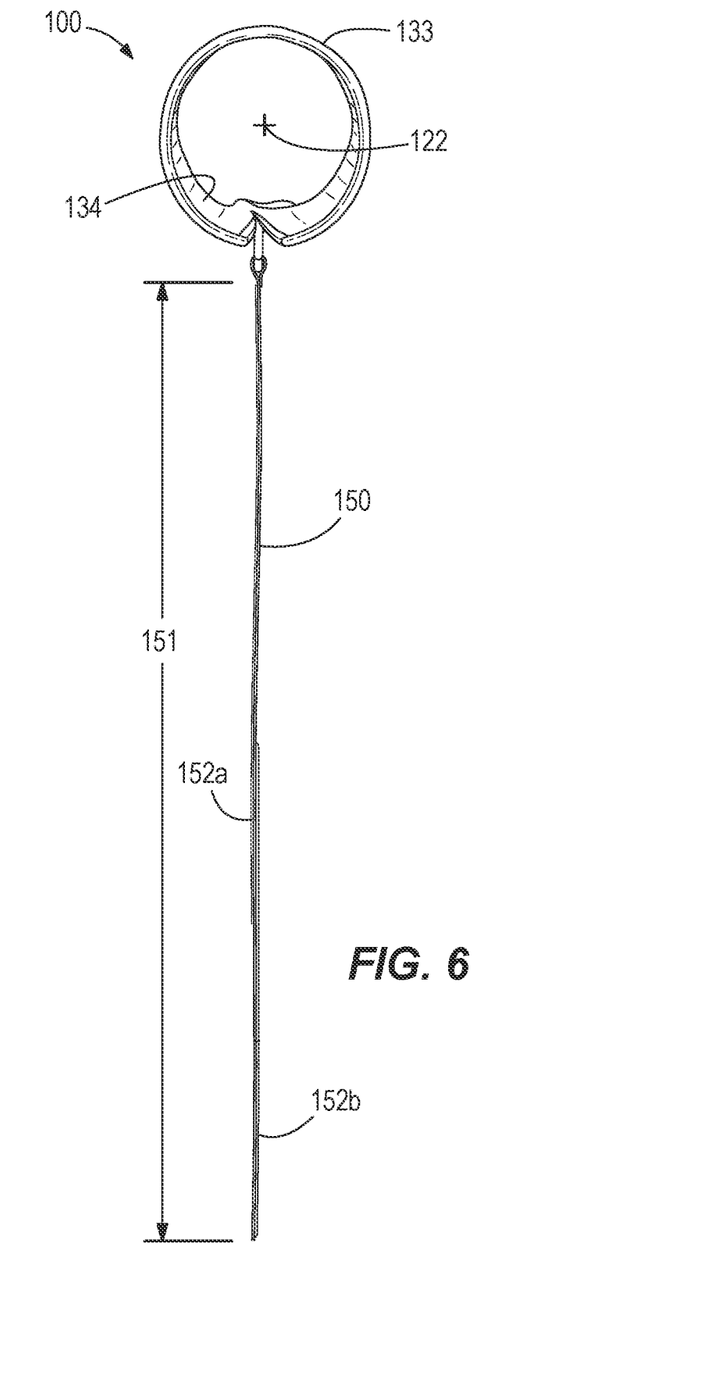
FIG. 6 is a top plan view of the embodiment of FIG. 2.

Turning now to FIGS. 4 and 5, a perspective view of one embodiment of the present invention is shown. The sleeve body 120 has one or more securing means 140. The one or more securing means 140 may permit the sleeve body 120 to be secured around a length of conduit 14. The one or more securing means 140 may secure the sleeve body 120 to the conduit 120 with a varying amount of securing force (e.g., a light securing force such that the sleeve 100 may be freely translated along the conduit axis 14a or a strong securing force such that the sleeve 100 cannot translate along the conduit axis 14a without great force).

According to an exemplary embodiment, the sleeve body 120 may have at least two securing means 140, including at least a first securing means 141 and a second securing means 142. The first securing means 141 is positioned closer to the proximal end 123 of the sleeve body 120 than the distal end 124 of the sleeve body 120, and a second securing means 142 located closer to the distal end 124 than to the proximal end 123. The first securing means 141 and second securing means 142 may be used to secure the sleeve 100 around the conduit 14. According to an exemplary embodiment, the first securing means 141 and second securing means 142 permits the sleeve 100 to be secured around a length of conduit 14 having a multitude of different diameters, including a single conduit 14 having a first diameter at one position along the conduit axis 14a and a second diameter at another position along the conduit axis 14a.

Figure 3:
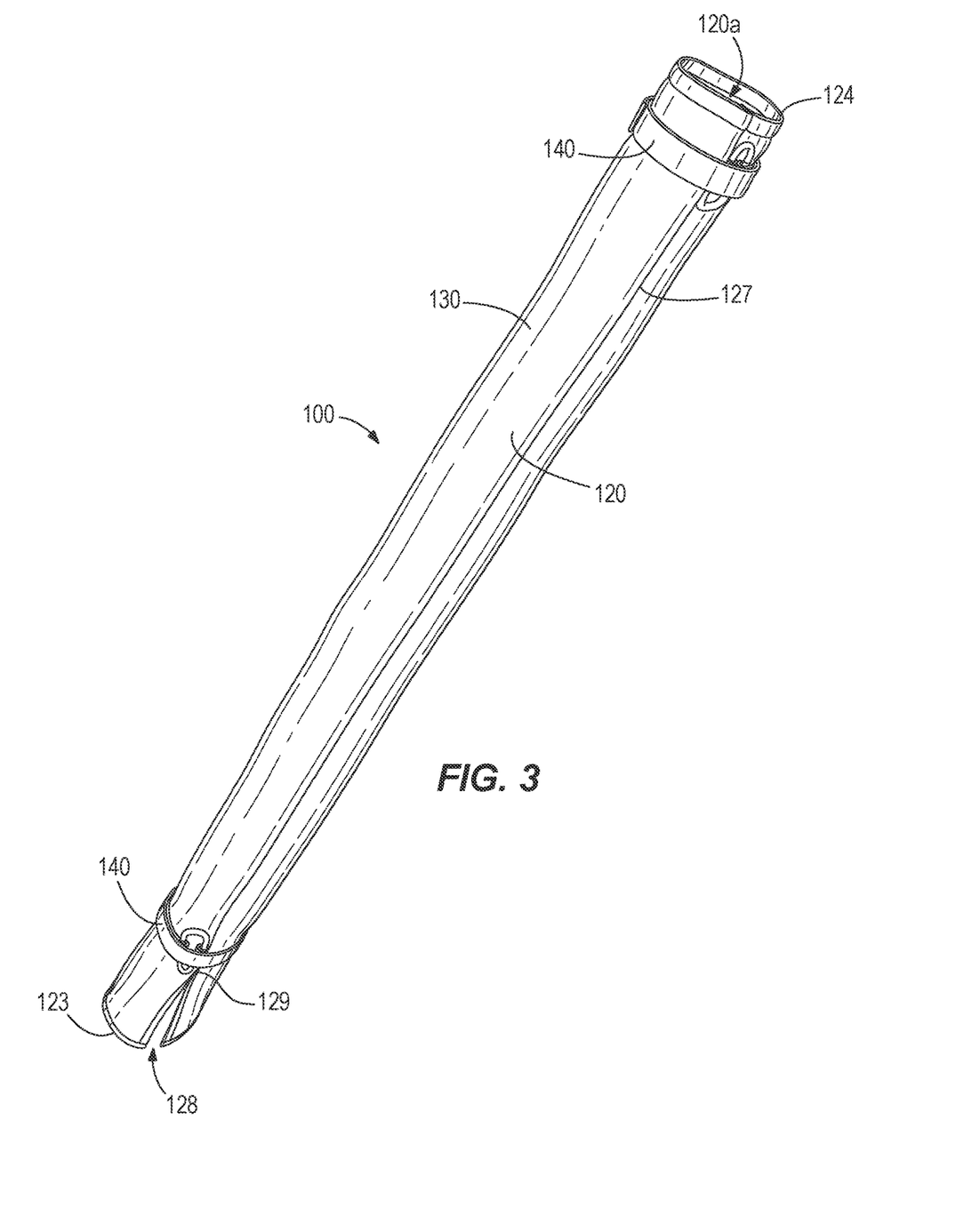
FIG. 3 is a second perspective view of the embodiment of FIG. 2 in the secured position.

As shown in FIGS. 3 and 4, the securing means 140 may include a coupling means 143, and a strap 150 to facilitate the securing of the sleeve 100 around the conduit 14. According to an exemplary embodiment, the coupling means 143 may be coupled to the sleeve body 120 using a loop 144. For example, a portion of the coupling means 143 could be coupled to the loop 144 which is then coupled to the sleeve body 120. The coupling means 143 may be permanently coupled to the sleeve body 120 so that it cannot be non-destructively removed during ordinary use. For example, the coupling means 143 may be a solid ring sewn into loop 144.

Alternatively, the coupling means 143 may be removably coupled to the sleeve body 120 to enable a user to non-destructively remove the coupling means 143. According to such embodiments, the coupling means 143 may be a carabiner, a swivel-eye snap hook, one or more snap fasteners, one or more sewing buttons, a split key ring, a hinged snap ring, or similar such device(s).

In other embodiments, the securing means 140 can be directly affixed to the sleeve body 120, thereby eliminating the need for any coupling means 143 or loop 144. For example, the securing means 140 could comprise the strap 150 coupled to the sleeve body 120 by sewing or adhesive means. Furthermore, the securing means 140 could be removably coupled to the outer surface 133 of the sleeve body 120 without any coupling means 143 or loop 144, such as when the securing means is a rachet strap, elastic band, zip tie, etc.

In another embodiment, the securing means 140 could comprise an elastic band mounted to the sleeve body 120. Such an elastic band could be removably mounted around the outer surface 133 of the sleeve body 120. In other embodiments, the elastic band could be permanently fixed to the sleeve body 120 by sewing or adhesive means. When permanently fixed, the elastic band could be mounted on the outer surface 133, to the inner surface 134, sandwiched between the outer surface 133 and the inner surface 134 (i.e., within the sleeve wall 130).

As shown in FIG. 4, the strap 150 can extend radially from the sleeve body 120 (i.e., substantially perpendicular to the sleeve axis 122) when coupled—whether directly affixed or indirectly coupled—to the sleeve body 120. The strap 150 may comprise a strap length 151 and a fastening means 152. According to an exemplary embodiment, the strap length 151 may be greater than the circumference of the outer surface 133 of the sleeve body 120 so as to enable a user to wrap the strap 150 circumferentially around the outer surface 133 of the sleeve body 120 at least one full revolution when securing the sleeve body 120 around the conduit 14. Also shown in FIG. 4 is an optional support strap 160 coupled to the sleeve body 120 at each end thereof, such as by extending through the coupling means 143, or by being sewn directly to the body 120 at one or both ends. The support strap 160 is preferably adjustable in its length, such as by using a strap fold-over in combination with a friction buckle 162, or alternatively snaps, buttons, hook-and-loop fastener members. In use the optional support strap 160 may be used to store the sleeve 120 or the conduit 14 within the sleeve 120 on a support structure, such as a storage hook. Additionally, during use of the conduit 14, the support strap 160 may be placed advantageously on a portion of a human user's body, such as over a shoulder.

The fastening means 152 may be used to circumferentially fasten the strap 150 of the securing means 140 around the sleeve body 120, which may in turn secure the sleeve body 120 around the conduit 14. Engaging the securing means 140 may apply some amount of circumferential force around the conduit 14 so as to prevent the sleeve body 120 from separating from the conduit 14 by force of gravity or during ordinary use.

According to an exemplary embodiment, the fastening means 152 may be a hook-and-loop fastener (i.e. VELCRO). In such embodiments, the fastening means 152 may be comprised of the "hook" side of the hook-and-loop fastener while the outer layer 133 of the sleeve wall 130 may advantageously be comprised of a material that can act as the "loop" side of the hook-and-loop fastener (i.e. toothy fabrics such as wool) so as to permit the coupling of the strap 150 to the outer layer 133 of the sleeve wall 130. In another embodiment, the strap 150 may include both the "hook" 152*a* and "loop" 152*b* sides of a hook-and-loop fastener so as to permit the strap 150 to adhere to itself when secured around the sleeve body 120. In other embodiments, the fastening means may be a snap fastener, a buckle, rachet mechanism, or magnetic fastening device.

As shown in FIGS. 3-7, the sleeve body 120 includes a seam 127 that extends along the sleeve body 120 in a direction substantially parallel to the sleeve axis 122. The seam 127 may be created by the construction of the sleeve body 120 from the sleeve wall 130, which in turn is comprised of one or more layers 135 of material. According to an exemplary embodiment, a sleeve body 120 may be constructed using the sleeve wall 130 having one or more layers 135 of pliable material having substantially planar shape at rest. In such embodiments, the sleeve body 120 takes a substantially tubular shape when opposing ends 132 of the sleeve wall 130 are mated together. The line along which the opposing ends 132 of sleeve wall 130 mate thus creates the seam 127.

The opposing ends 132 of the sleeve wall 130 may overlap in creating the seam 127. Alternatively, the opposing ends 132 of the sleeve wall 130 could be mated without overlapping. Moreover, the seam 127 could be created by mating the opposing ends 132 of the sleeve wall 130 by either permanent mating means (e.g., sewing, adhesive means, etc.) or temporary mating means (e.g., snap fasteners, buttons, hook-and-loop fasteners, etc.). Alternatively, no mating means could be used, leaving the opposing ends 132 of the sleeve wall 130 disengaged. In such an embodiment, the sleeve body 120 may take a generally tubular structure only when the one or more securing means 140 are used to secure the sleeve body 120 around the conduit 14.

In some embodiments, the seam 127 is formed along the entire sleeve length 121 (i.e. from proximal end 123 to distal end 124) by the mating of the opposing ends 132 of the sleeve wall 130. For example, the opposing ends 132 of the sleeve wall 130 may be mated by sewing means or using hook-and-loop fasteners from the proximal end 123 to the distal end 124. According to an exemplary embodiment, the seam 127 may optionally be formed only along a substantial portion of the sleeve length 121. In this embodiment, the opposing ends 132 of the sleeve wall 130 are neither permanently nor temporarily mated together along some portion of the sleeve length 121, thus forming one or more relief slots 128. According to an exemplary embodiment, the optional relief slot 128 may extend from one or both of the proximal end 123 and the distal end 124 to a terminating end 129 along the sleeve axis 122. In a preferred embodiment, the relief slot 128 extends from the proximal end 123 to the terminating end 129, where the distance from the proximal end 123 to the terminating end 129 is between 5-25% of the total sleeve length 121.

The relief slot 128 may alternatively be formed be formed along the sleeve body 120—whether or not parallelly disposed to the sleeve axis 122—in some position other than along the seam 127. For example, a relief slot 128 may be included in a position diametrically opposed to the seam 127. In such a configuration, a plurality of relief slots 128 may extend from one or both of the proximal end 123 or the distal end 124.

While the sleeve body 120 has a substantially tubular structure having a substantially uniform diameter 120*b*, the relief slot 128 permits the widening of the sleeve body 120 in the location of the relief slot 128. According to a preferred embodiment, the relief slot 128 permits the widening of the sleeve body 120 at the proximal end 123 to facilitate the installation of the sleeve body 120 over the conduit 14. According to an exemplary embodiment, the first securing means 141 is positioned on the sleeve body 120 at a position along the sleeve axis 122 that is near the terminating end 129 of the relief slot 128. In another embodiment, the first securing means 141 may be positioned on the sleeve body 120 at some position along the sleeve axis 122 between the proximal end 123 and the terminating end 129 of the relief slot 128.

The one or more securing means 140—whether mounted directly to the sleeve body 120 or some intermediate loop 144 and coupling means 143 are used—may be advantageously mounted to the sleeve body 120 along the seam 127. In such embodiments, the securing means 140 may be mounted to the sleeve wall 130 before the seam 127 is created by the mating of the opposing ends 132 of the sleeve wall 130.

In use, the sleeve 100 is preferably fitted around the conduit 14. The conduit 14 is generally a tubular structure formed along a conduit axis 14a. The conduit 14 may have a circular, rectangular, triangular, or other geometric or irregular cross-sectional shape. Alternatively, the conduit 14 may terminate in or otherwise include a substantially conical structure or some other slender shape wherein the cross-sectional area is small relative to the length. The conduit 14 may have a hollow core (not shown) to permit the flow of fluid (i.e., liquid or gas) of various kinds therethrough. A maximum diameter of any cross-section of the conduit 14, taken perpendicular to the conduit axis 14a, is preferably less than or equal to the inner diameter 120b of the sleeve body 120 such that the conduit 14 may be positioned inside of the hollow core 120a of the sleeve body 120. When the conduit 14 is positioned inside of the sleeve body 120, the conduit axis 14a and the sleeve axis 122 may be substantially coaxial.

The conduit 14 may be used to direct various fluids (i.e., gases or liquids) of varying temperatures. As such, there may exist a temperature gradient (e.g., 20° Fahrenheit) between a surface temperature of the conduit 14 and the ambient temperature. In such circumstances, it may be desirable to protect against injury resulting from physical contact with the cold or hot surface temperature of the conduit 14. Accordingly, the sleeve 100 may be installed around the conduit 14 to protect against injury. Additionally or alternatively, the sleeve 100 may be installed around the conduit 14 for a primary purpose of insulating the conduit 14 to in an attempt to prevent thermal gain or loss to the fluid flowing through the conduit 14.

According to an exemplary embodiment, the conduit 14 may include at least one free end 15, whereby a gas or liquid will be dispensed from the conduit 14 into the atmosphere. The free end 15 may comprise a nozzle 16 or filter, for example. In such embodiments, the sleeve 100 may be installed near the free end 15 of the conduit 14 to enable a user to safely control the dispensing of fluid or gas from the free end 15. According to another exemplary embodiment, the conduit 14 is the output hose of a wall-mounted blow dryer assembly 12 used to dry a previously-bathed animal by discharging hot air. In such embodiments, the sleeve 100 may be installed to avoid injury or burn to a user or to the previously-bathed animal during operation of the blow dryer assembly 12.

According to another embodiment, the conduit 14 may be continuous such the conduit 14 does not have an identifiable free end 15 (e.g., steam piping or cold storage piping). In such embodiments, the sleeve 100 may be installed around the conduit 14 irrespective of any free end 15.

The foregoing is illustrative only of the principles of embodiments according to the present invention. Modifications and changes will readily occur to those skilled in the art, so it is not desired to limit the invention to the exact disclosure herein provided. While the preferred embodiment has been described, the details may be changed without departing from the invention, which is defined by the claims.

What is claimed is:

1. A device comprising:
   a tubular structure extending between an open proximal free end and an open distal free end and comprising a plurality of layers;
   a relief slot extending longitudinally inward from one of the proximal free end and the distal free end; and
   a first securing means coupled to and extending radially from the tubular structure, the first securing means being disposed at a first longitudinal location closer to one of the distal end and the proximal end than to the other of the proximal end and the distal end,
   wherein the first securing means is extendable about a circumference of the tubular structure at the first longitudinal location, and
   wherein one layer of the plurality of layers comprises thermally-reflective fabric and another layer of the plurality of layers comprises moisture-wicking material.

2. A device according to claim 1, further comprising:
   a second securing means coupled to and extending radially from the tubular structure, the second securing means being disposed at a second longitudinal location closer to the other of the proximal end and the distal end,
   wherein the second securing means is extendable about a circumference of the tubular structure at the second longitudinal location.

3. A device according to claim 2, wherein the first and second securing means are releasably coupled to the tubular structure.

4. A device according to claim 1, wherein the first securing means comprises at least one of hook-and-loop fastener and elastic.

5. A device according to claim 1, wherein the first securing means is releasably coupled to the tubular structure.

6. A device according to claim 1, wherein the relief slot terminates between the one of the proximal end and the distal end and the first securing means.

7. A system comprising:
   a substantially tubular structure extending between an open proximal free end and an open distal free end and comprising a plurality of layers;
   a relief slot extending longitudinally inward from one of the proximal free end and the distal free end;
   a conduit extending at least partially through the substantially tubular structure;
   a securing means coupled to and extending radially from the tubular structure;
   wherein the securing means releasably secures the substantially tubular structure about at least a portion of the conduit, and
   wherein one layer of the plurality of layers comprises thermally-reflective fabric and another layer of the plurality of layers comprises moisture-wicking material.

8. A system according to claim 7, wherein the conduit extends completely through the substantially tubular structure.

9. A system according to claim 8, wherein the conduit comprises a free end terminating with a nozzle.

10. A system according to claim 7, further comprising heated fluid disposed within the conduit.

11. A system according to claim 10, wherein the heated fluid is moving through the conduit in a direction from the proximal end towards the distal end.

12. A system according to claim 11, wherein the heated fluid is heated air.

13. A system according to claim 7, wherein the conduit comprises a substantially cylindrical flexible tube.

14. A system according to claim 13, wherein the cylindrical tube comprises a corrugated circumferential wall.

15. A method comprising the steps of:
- providing a substantially tubular structure having an open proximal end and an open distal end and comprising a plurality of layers and a relief slot extending longitudinally inward from one of the proximal end and the distal end;
- providing a conduit;
- providing a circumferential securing means;
- inserting the conduit at least partially into the substantially tubular structure;
- securing the substantially tubular structure about the conduit using the circumferential securing means; and
- conducting a fluid through the conduit,
- wherein one layer of the plurality of layers comprises thermally-reflective fabric and another layer of the plurality of layers comprises moisture-wicking material.

16. The method of claim 15, wherein the conduit extends completely through the substantially tubular structure.

17. The method of claim 15, wherein the conduit comprises a free distal end terminating with a nozzle.

18. The method of claim 17, wherein the substantially tubular structure is secured proximate the free end.

19. The method of claim 18, further comprising the step of dispensing the fluid from the free end.

* * * * *